United States Patent [19]
Liao

[11] Patent Number: 5,228,202
[45] Date of Patent: Jul. 20, 1993

[54] EXTENSION HANDLE FOR TREE TOP PRUNERS

[75] Inventor: Dick Liao, Bridgewater, Mass.
[73] Assignee: Greenlife Products Corp., Bridgewater, Mass.
[21] Appl. No.: 929,955
[22] Filed: Aug. 17, 1992
[51] Int. Cl.⁵ .............. B25G 3/00; B25G 1/04
[52] U.S. Cl. .................... 30/249; 30/296.1; 15/144.4; 16/115
[58] Field of Search ......... 30/249, 296.1, 250; 16/115, 114 R; 15/144.4, 144.3

[56] References Cited

U.S. PATENT DOCUMENTS

| | | | |
|---|---|---|---|
| 2,228,635 | 1/1941 | Magennis | 30/249 |
| 2,259,642 | 10/1941 | Hoyt | 30/249 |
| 2,932,047 | 4/1960 | Johnston | 15/144.4 |
| 4,154,545 | 5/1979 | Pinto et al. | 16/115 |
| 4,440,517 | 4/1984 | Potter et al. | 16/115 |
| 4,524,484 | 6/1985 | Graham | 15/144.4 |
| 4,654,971 | 4/1987 | Fettes et al. | 30/296.1 |
| 4,916,818 | 4/1990 | Panek | 30/296.1 |
| 4,922,577 | 5/1990 | Unger | 16/115 |

Primary Examiner—Douglas D. Watts
Assistant Examiner—Hwei-Siu Payer
Attorney, Agent, or Firm—Jacobson, Price, Holman & Stern

[57] ABSTRACT

An extension handle for a tree pruner consisted of an inner sleeve movably retained inside a connecting socket to hold a handle tube and a shear holder tube, wherein the inner sleeve has an inward flange to stop the handle tube, a plurality of raised portions adjacent to the bottom end thereof engaged into respective recessed holes on the handle tube to hold the handle tube in place, a plurality of steel balls in respective recessed holes adjacent to the top end thereof engaged into respective recessed holes on the shear holder tube to hold the shear holder tube in place. A constraining ring is mounted on a top flange on the connecting socket and retained in place by hooks to constrain the steel balls inside the respective recessed holes on the inner sleeve. The shear holder tube has a tightening up screw for fastening a tree pruner.

3 Claims, 3 Drawing Sheets 5,228,202

EXTENSION HANDLE FOR TREE TOP PRUNERS

BACKGROUND OF THE INVENTION

The present invention relates to an extension handle for tree top pruners. The extension handle includes an inner sleeve fastened inside a connecting socket by springs to hold a handle tube and a shear holder tube. The inner sleeve has an inward flange to stop the handle tube, a plurality of raised portions below the inward flange engaged into respective recessed holes on the handle tube to hold the handle tube in place, a plurality of steel balls received in respective recessed holes adjacent to the top end thereof and releasably engaged into respective recessed holes on the shear holder tube to hold it in place. A constraining ring is mounted on a top flange on the connecting socket and retained in place by hooks to constrain the steel balls inside the respective recessed holes on the inner sleeve. The shear holder tube has a tightening up screw for fastening a tree pruner.

In cutting the branches of a big tree, an extension extension handle may be attached to either grip of a tree pruner shears to extend its total length, so that the tree pruner can be controlled by a pull rope to cut the branches at distance. There is disclosed an extension handle for this purpose, which includes a socket having a plastic sleeve on the inside to hold a handle bar on the bottom and a shear holding bar on the top. The socket has a top flange covered with a ring plate. The top end of the plastic sleeve has two opposite spring plates on the inside, which spring plates each have a plurality of raised portions on it. As the shear holding bar was inserted into the plastic sleeve from the top, the raised portions on the spring plates engage into respective recessed portions on the shear holding bar to hold it in place. This arrangement permits the shear holding bar to slide inside the plastic tube so that the extension handle can be shortened when not in use. Because the raised portions on the spring plates are frequently rub against the outside wall of the shear holding bar, the raised portions are easy to get abrasion then the binding force of the spring plates on the shear holding bar may be weakened gradually, causing the shear holding bar easily to slide down during the operation and can't be used or hurt the user. Furthermore, because the handle bar is connected to the plastic tube simply through a sleeve joint, the handle bar may disconnect from the plastic sleeve easily.

SUMMARY OF THE INVENTION

The present invention has been accomplished under the aforesaid circumstances. According to one aspect of the present invention, the extension handle is consisted of a connecting socket having an inner sleeve movably fastened on the inside by springs to hold a handle tube on the bottom and a shear holder tube on the top, which inner sleeve has an inward flange on the inside to stop the handle tube, a plurality of steel balls received in respective recessed holes adjacent to the top end thereof releasably engaged into respective recessed holes on the shear holder tube to hold it in place, and a constraining ring mounted on the connecting socket on the top to constrain the steel balls in place. Moving the connecting socket downwards along the handle tube causes the inner sleeve to protrude over the connecting socket for inserting the shear holder tube. Once the shear holder tube has been inserted into the inner sleeve, it is retained to the inner sleeve by the steel ball and the constraining ring.

According to another aspect of the present invention, the top flange on the connecting sockets has a plurality of spaced hooks hooked in respective holes on the constraining ring to hold it in place, and therefore the steel balls are constantly constrained by the constraining ring in the respective recessed holes on the inner sleeve. According to still another aspect of the present invention, the inner sleeve has a plurality of raised portions below the inward flange engaged into respective recessed holes on the handle tube to hold the handle tube in place, and therefore the handle tube does not disconnect from the inner sleeve.

DETAILED DESCRIPTION OF THE PREFERRED EMBODIMENT

Figure 1:
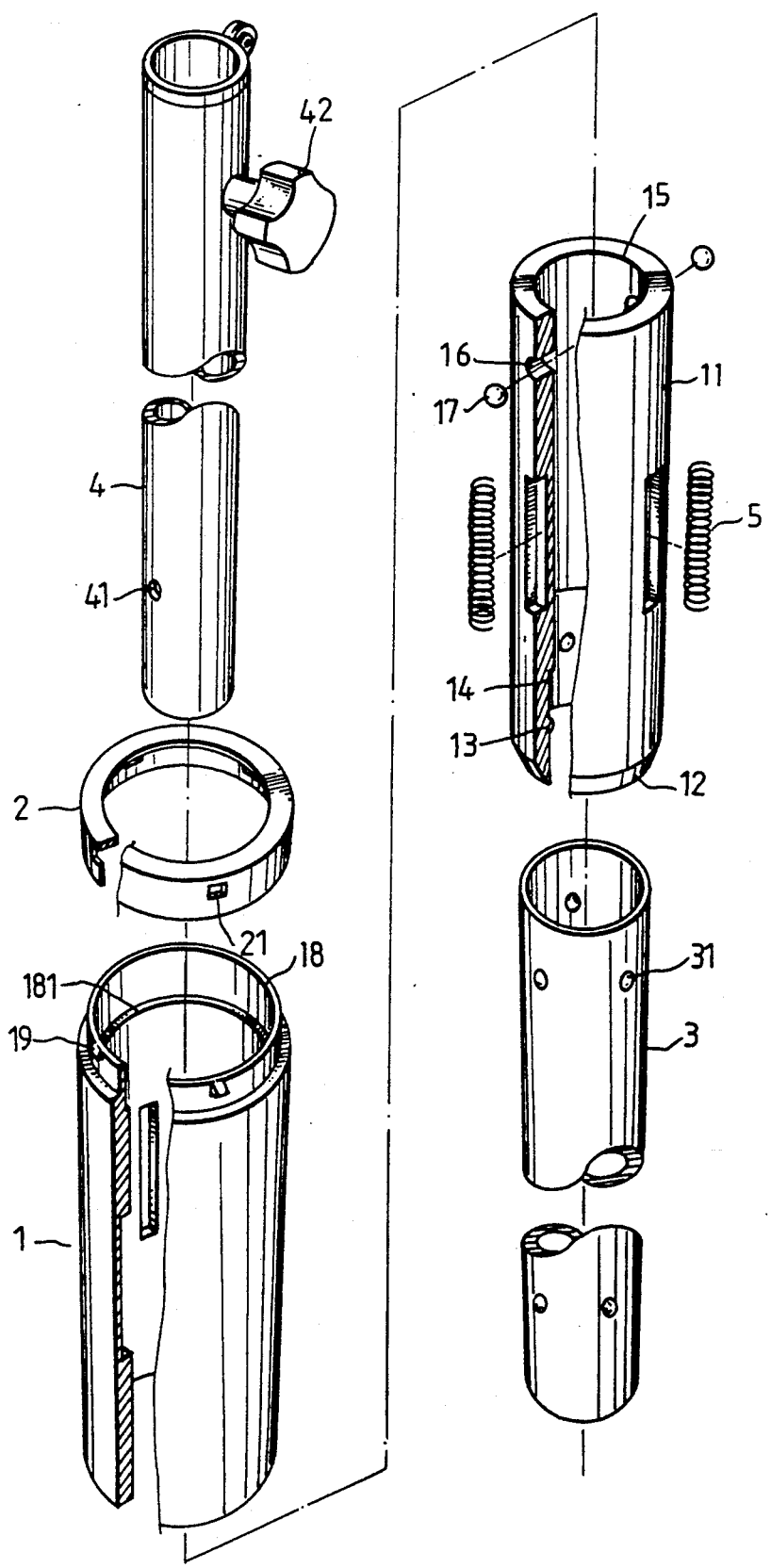
FIG. 1 is an exploded view of the preferred embodiment of the extension handle of the present invention.
Figures 2A, 2B:
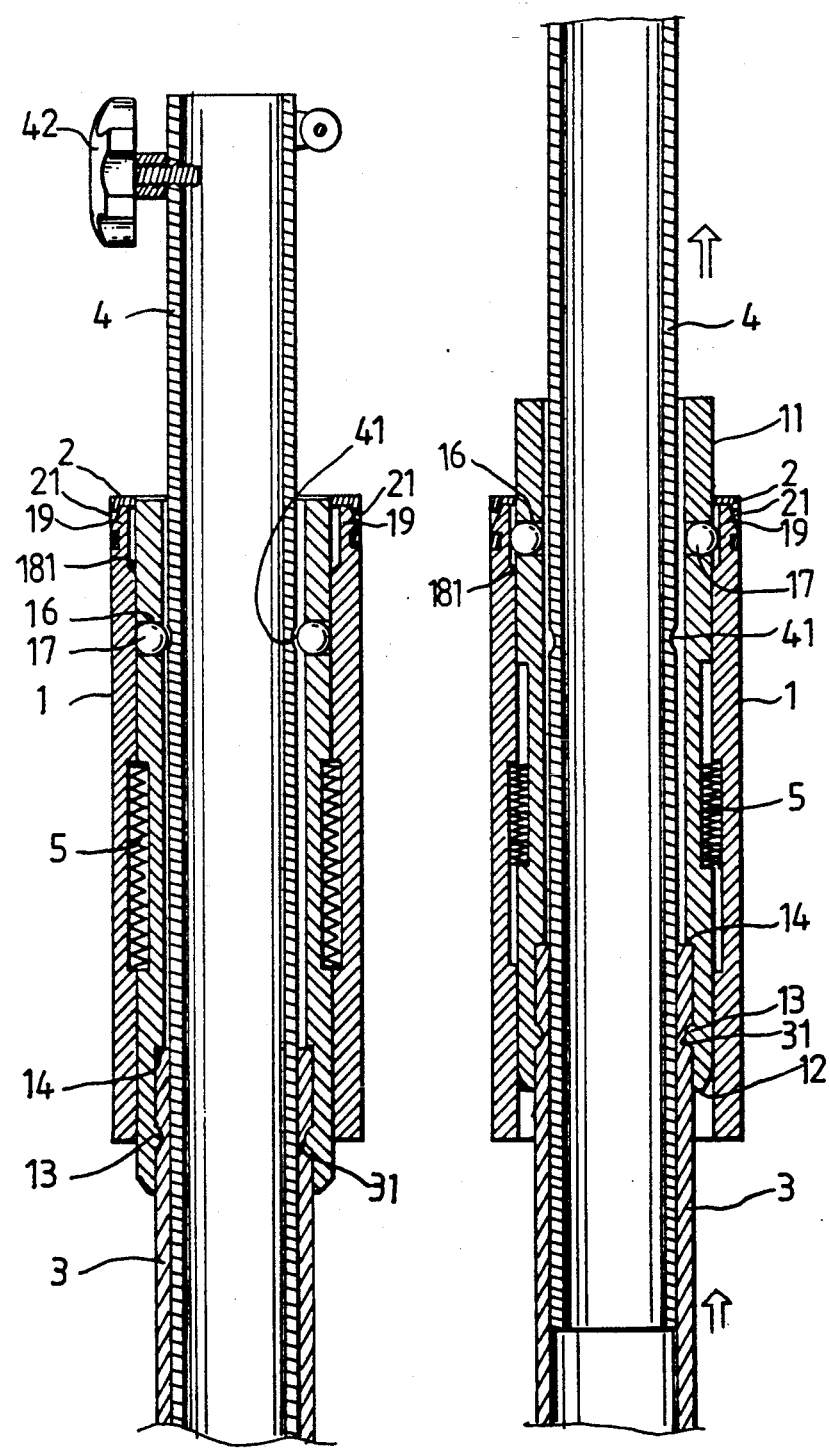
FIG. 2-A, FIG. 2-B are sectional assembly views of the extension handle.

Referring to FIG. 1 and FIG. 2-A, FIG. 2-B, an extension handle as constructed in accordance with the present invention is generally comprised of a connecting socket 1, a constraining ring 2, a handle tube 3, and a shear holder tube 4. The connecting socket 1 includes an inner sleeve 11 movably retained on the inside by springs 5. The inner sleeve 11 has a plurality of raised portions 13 equidistantly spaced around the inside wall adjacent to the bottom end 12 thereof, an inward flange 14 around the inside wall above the raised portions 13, and a plurality of recessed holes 16 around the inside wall adjacent to the top end 15 thereof which receive each a respective steel ball 17. The handle tube 3 has a plurality of recessed holes 31 equidistantly spaced around the outside wall adjacent to the top end thereof. The handle tube 3 is inserted into the inner sleeve 11 from the bottom end 12 and stopped against the inward flange 14, with the recessed holes 31 respectively engaged with the raised portions 13. The shear holder tube 4 has a plurality of recessed holes 41 spaced around the outside wall adjacent to the bottom end thereof, and a tightening up screw 42 adjacent to the top end thereof. Inserting the bottom end of the shear holder tube 4 into the inner sleeve 11 through the top end 15 causes the steel balls 17 on the recessed holes 16 of the inner sleeve 11 to respectively engage into the recessed holes 41 on the shear holder tube 4, and therefore the shear holder tube 4 and the inner sleeve 11 become firmly retained together. The connecting socket 1 has a plurality of hooks 19 spaced around a top flange 18 thereof. The constraining ring 2 has a plurality of holes 21 around the peripheral wall thereof. After the constraining ring 2 has been sleeved on the shear holder tube 4 and mounted on the top flange 18 of the connecting socket 1, the hooks 19 respectively hook in the holes 21 to retain the constraining ring 2 in place. The inside of the top flange 18 of the connecting socket 1 has the bevel face 181. The steel balls 17 can be pushed into the recessed holes 41 by the bevel face 181.

Figure 3:
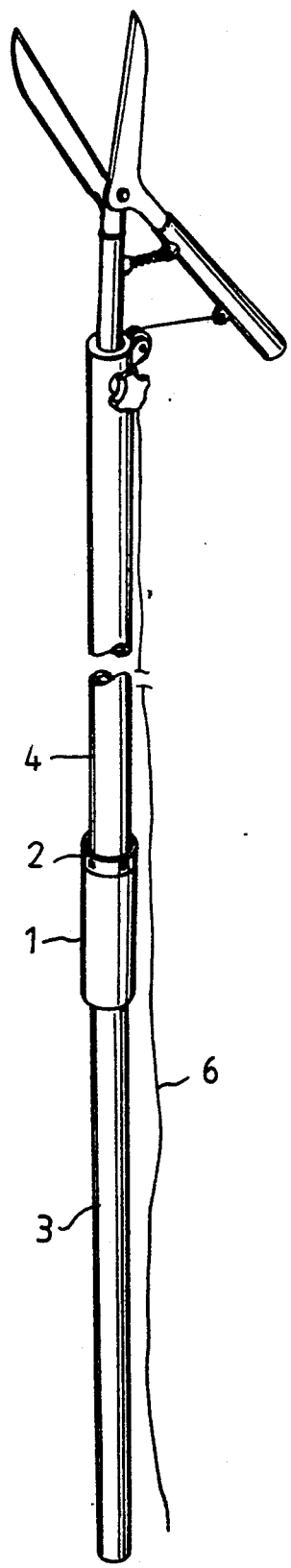
FIG. 3 is an installed view showing the operation of the extension handle in holding a tree pruner.

When in use, referring to FIG. 2-A, the connecting socket 1 can be pushed downwards along the handle tube 3. Because the handle tube 3 is stopped against the inward flange 14 on the inner sleeve 11, moving the connecting socket 1 downwards along the handle tube 3 causes the inner sleeve 11 to project over the connecting socket 1. When the inner sleeve 11 is extended out of the connecting socket 1, the steel balls 17 is constrained inside the recessed holes 16 by the constraining ring 2. Once the inner sleeve 11 has been extended out of the connecting socket 1, the shear holder tube 4 can be inserted into the inner sleeve 11 and the handle tube 3 into non-operative position. The shear holder tube 4 can be pulled upwards from the inner sleeve 11 causes the steel balls 17 to engage into the recessed holes 41 on the shear holder tube 4, then pull the connecting socket 1 back to the original position (referring to FIG. 2-B), the shear holder 4 and the handle tube 3 can be connected together through the connecting socket 1 and the inner sleeve 11, and therefore the extension handle becomes set into operative position. After the tree pruner has been fastened to the shear holder tube 4 and secured in place by the tightening up screw 42, as shown in FIG. 3, the tree pruner is controlled by a pull rope 6 to trim a tree.

What is claimed is:

1. An extension handle for a tree pruner comprising a tubular connecting socket, an inner sleeve, a handle tube, a shear holder tube and a constraining ring, wherein:

said connecting socket comprises a top flange; and the inside of the top flange of the connecting socket has a bevelled face;

said inner sleeve is movably retained inside said connecting socket by springs, and comprises a plurality of raised portions equidistantly spaced on an inner wall thereof adjacent to a bottom end thereof, an inward flange on the inner wall above the raised portions, and a plurality of steel balls received in respective recessed holes on the inner wall adjacent to a top end thereof;

said handle tube comprises a plurality of recessed holes equidistantly spaced around an outer wall adjacent to a top end thereof inserted into said inner sleeve from a bottom end of the inner sleeve with the raised portions on said inner sleeve respectively engaged into the recessed holes thereof;

said shear holder tube comprises a plurality of recessed holes around an outer wall adjacent to a bottom end thereof inserted into said inner sleeve from a top end of the inner sleeve with said steel balls respectively engaged into the recessed holes thereof, a tightening up means adjacent to a top end thereof for fastening a tree pruner; and said constraining ring is mounted on the top flange of said connecting socket to constrain said steel balls inside the respective recessed holes on said inner sleeve.

2. An extension handle as claimed in claim 1, wherein said tightening up means comprises a tightening up screw.

3. An extension handle as claimed in claim 1, including a plurality of hooks spaced around the top flange of the connecting socket and holes around a peripheral wall of the constraining ring engaged by said hooks to hook the constraining ring in place.

* * * * *